United States Patent [19]

Shepherd

[11] Patent Number: 4,482,181
[45] Date of Patent: Nov. 13, 1984

[54] GRILL LIFTER

[75] Inventor: Charles G. Shepherd, Oakville, Canada

[73] Assignee: B. D. Wait Co. Limited, Oakville, Ontario, Canada

[21] Appl. No.: 258,255

[22] Filed: Apr. 28, 1981

[51] Int. Cl.³ .............................................. A47J 45/10
[52] U.S. Cl. ........................................ 294/12; 294/26; 294/27 R
[58] Field of Search ................... 294/9, 10, 12, 13, 15, 294/26, 27 R, 27 H, 32, 92, 158, 164, 170, 171; 16/114 R, 114 A, 116 R

[56] References Cited

U.S. PATENT DOCUMENTS

| 358,803 | 3/1887 | Chestnut | 294/10 X |
|---|---|---|---|
| 896,133 | 8/1908 | Mayer | 294/12 X |
| 1,360,359 | 11/1920 | Beaudet | 294/12 X |
| 1,587,350 | 6/1926 | Parke | 294/9 |
| 2,007,039 | 7/1935 | Dickson | 294/170 X |
| 2,613,978 | 10/1952 | Marulli | 294/27 R |

FOREIGN PATENT DOCUMENTS

| 587396 | 11/1933 | Fed. Rep. of Germany | 294/27 R |
|---|---|---|---|
| 108852 | 10/1943 | Sweden | 294/12 |
| 573946 | 12/1945 | United Kingdom | 294/27 R |

Primary Examiner—Johnny D. Cherry

[57] ABSTRACT

A lifter for lifting and manipulating a grill over a heat source such as a barbeque has a hooked portion shaped to pass between adjacent parallel bars of the grill and upon rotating the lifter, to locate under one of the adjacent bars with ends of the hooked portion spaced along this bar. A reaction element is spaced from the hooked portion for engagement with at least one further bar spaced from the adjacent bars; and a handle, the hooked portion and the reaction element are coupled in a fixed relationship relative to one another so that the lifter can be used to move the grill while maintaining the grill in a generally horizontal position with the reaction element in engagement with the further bar or bars, and to lift the grill with the grill hanging freely from the lifter.

4 Claims, 9 Drawing Figures

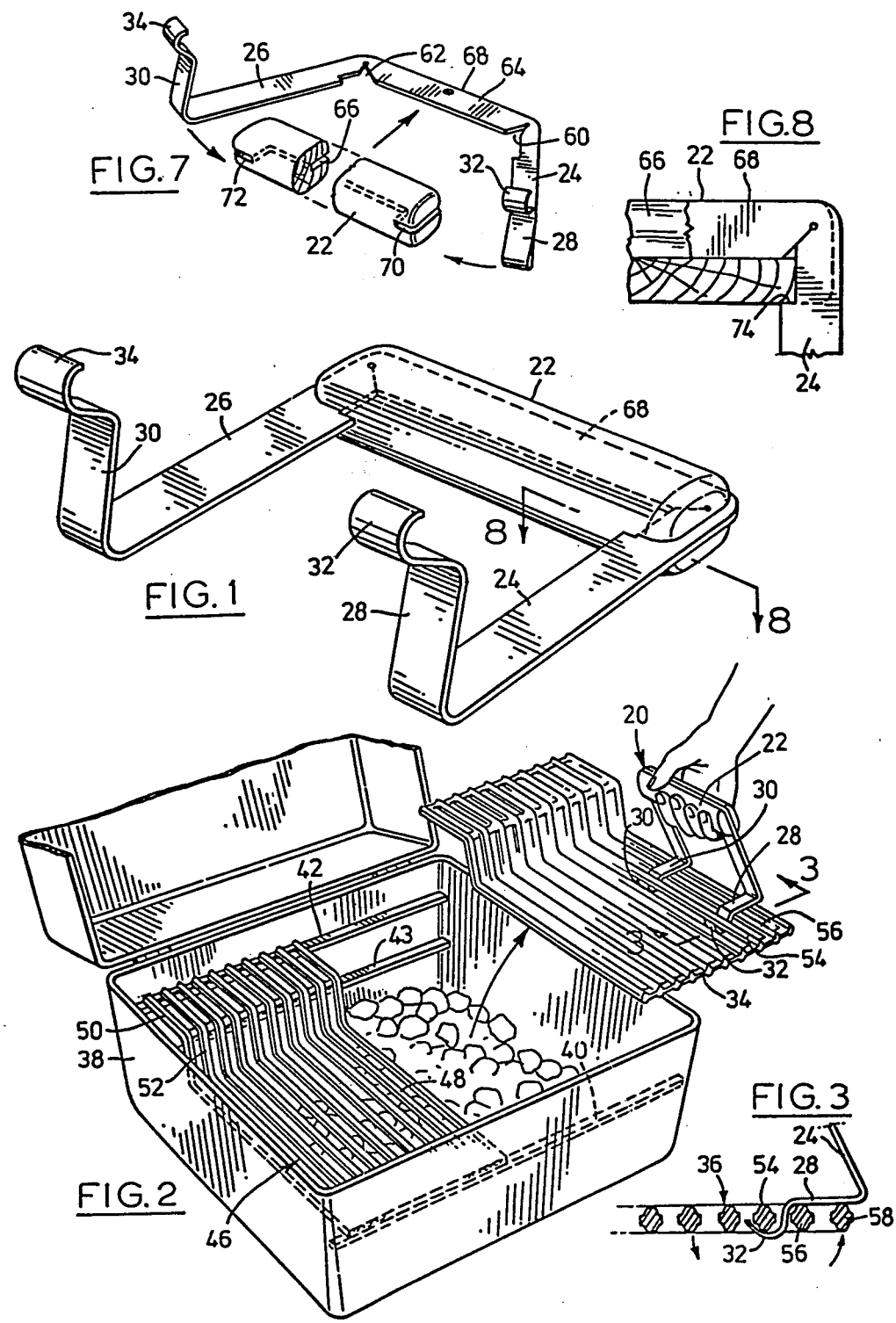

GRILL LIFTER

This invention relates to a lifter for manipulating a grill used on barbeques and the like.

There are many forms of structures designed for cooking over hot charcoal or other sources of heat. Such structures are commonly referred to as barbeques, and for the purpose of the present invention the word "barbeque" is intended to include all structures having a tray or the like containing a source of heat and a grill over the heat for supporting the food to be cooked.

One of the main difficulties encountered when using a barbeque is the need to vary the heat applied to the food. The present invention is intended to simplify making adjustments to grills of the type which can be turned around or turned over to change the height of the food-supporting surface above the heat source. These grills are generally z-shaped in cross-section for support on two of three shelves at different heights and at opposite sides of the heat source. The height of the food-supporting surface depends upon which of several ways the grill is placed on the shelves.

Accordingly the invention provides a lifter for engaging selected ones of the bars in a grill to lift the grill either so that it can be retained in a horizontal position for simply turning the grill back to front, or so that it hangs down vertically from the lifter for turning the grill over.

The invention will be better understood with reference to the following description which refers to the accompanying drawings, in which:

FIG. 1 is a perspective view looking generally from the bottom of a preferred embodiment of the lifter according to the invention;

FIG. 2 is a perspective view showing the lifter in use to support a grill in a generally horizontal position for turning the grill back to front;

FIG. 3 is a sectional view of a portion of the grill and lifter on line 3—3 of FIG. 2;

FIG. 7 (drawn adjacent FIG. 1) illustrates parts of the lifter during assembly;

FIG. 8 is a sectional view of a part of the lifter on line 8—8 of FIG. 1; and

Figure 4:
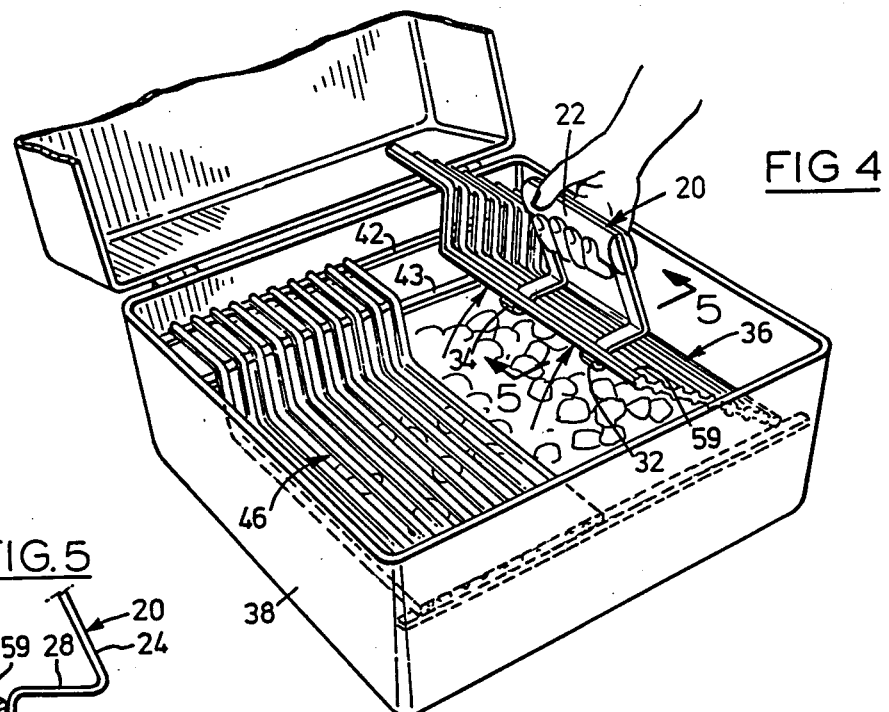
FIG. 4 is a perspective view of the lifter being used to turn the grill over and showing an initial movement.

Reference is first made to FIG. 1 which shows a preferred embodiment of a lifter 20 consisting of a handle 22 terminating at a pair of parallel legs 24, 26 which in turn terminate at respective reaction portions 28, 30. These portions define acute angles with the legs 24, 26 and terminate at hooked end portions 32, 34. The acute angle is such that a perpendicular drawn at the hooked end portions with reference to a plane containing the reaction portions 28, 30 will pass through the handle 22 for reasons which will be explained later.

The relationships between the end portions 32, 34 and the remainder of the handle will be explained more fully with reference to the use of the handle.

As seen in FIG. 2, the handle 20 is being used to lift a grill 36 while maintaining the grill in a generally horizontal position. The grill is to be used in association with a barbeque structure 38 having a front shelf 40 and respective upper and lower rear shelves 42, 43 for supporting the grill 36 in a variety of positions to vary the height of the food-supporting surface of the grill above charcoal, or other heat source, 44. A second grill 46 is in position resting on the front shelf 40 and the upper rear shelf 42. The grill includes a first portion 48, a second portion 50, and riser portion 52. The riser portion effectively offsets one of the portions 48, 50 from the other portion. Consequently, if the grill is rotated about a vertical axis (i.e. turned back to front), then the grill can rest on the front shelf 40 with the portion 50 adjacent this shelf and on the lower rear shelf 43. This will lower the food-supporting surface of the grill. Alternatively, if the grill is turned over as well as rotated back to front, then it will rest on the front shelf 40 and on the upper rear shelf 42 to provide a higher food-supporting surface.

In FIG. 2, a user is supporting the grill 36 with the lifter 20 and, because of the arrangement of the lifter relative to the grill, it is possible to maintain the grill in a horizontal position for rotating it back to front. This can be explained with reference to FIG. 3 where it is seen that the hooked end portion 32 (which is exemplary of both end portions 32, 34) is proportioned to project through the space between adjacent bars 54, 56 of the grill 36 and to engage under the bar 54. Because the center of gravity of the grill is to the left of the end portion 32 (as drawn), there is a tendency for the grill to rotate in the direction indicated by the arrows. This is resisted by engagement with the reaction portion 28, the necessary reaction torque being provided by the user gripping the handle of the lifter.

The lifter is engaged in the grill 36 by slipping the very ends of the portions 32, 34 between the bars 54, 56 with the reaction portions 28, 30 in a generally vertical position. Once the end portions are between the bars, the lifter is rotated bringing the end portions under the bar 54 and the reaction portions 28, 30 into engagement with a further bar 58. To remove the lifter, the procedure is reversed.

Figure 5:
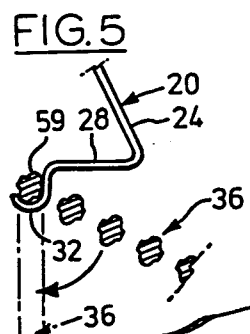
FIG. 5 is a sectional view on line 5—5 of FIG. 4.
Figure 6:
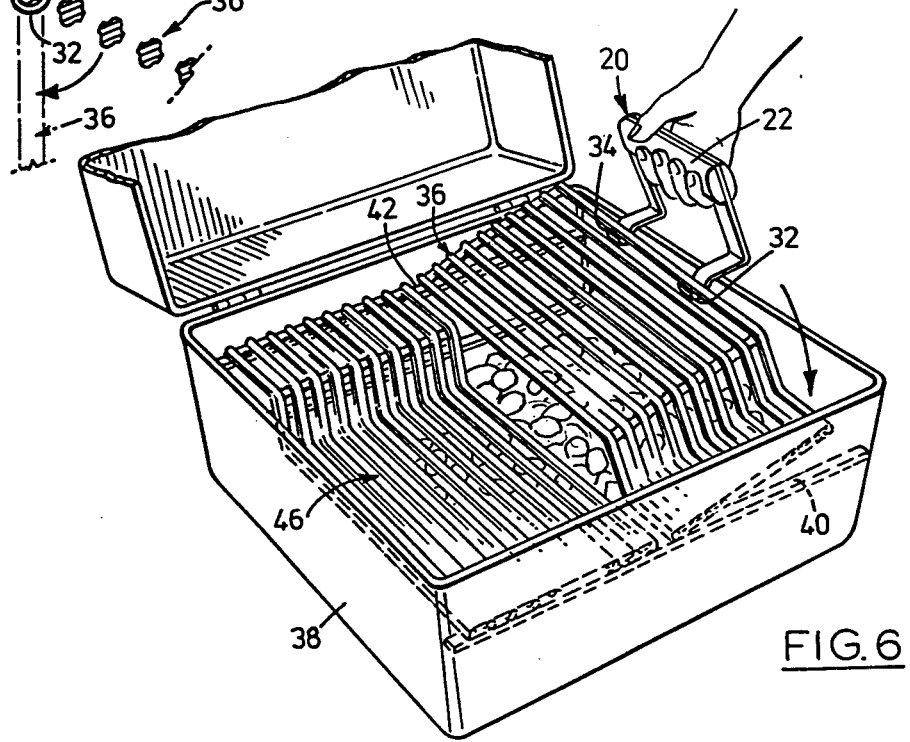
FIG. 6 is a further perspective view showing the grill being turned over after moving from the position shown in FIG. 4.

If it is desired to turn the grill over instead of turning it back to front, a procedure is adopted which is illustrated in FIGS. 4 to 6. As seen in FIG. 4, the lifter has been engaged in a different manner from that shown in FIG. 2. In FIG. 4 the lifter is engaged about an outermost one 59 of the bars with the reaction portions 28, 30 (FIG. 1) between the hooked end portions and the center of gravity of the grill 36. Alternatively, any of the three outermost bars can be thus engaged. With any of these bars, the tendency is for the grill to rotate in the lifter, in the direction indicated by an arrow in FIG. 5, as the user raises the lifter, so that the grill eventually hangs vertically from the lifter. In order to limit forces which would otherwise tend to rotate the lifter, the handle 22 (FIG. 1) is positioned effectively above the hooked end portions 32, 34 when the reaction portions 28, 30 are in a horizontal position. To achieve this, the afore-mentioned acute ange exists between the legs 24, 26 and the portions 28, 30. It will be appreciated that if this angle were 90°, the weight of the grill would produce a significant bending moment acting around the handle which would tilt the lifter to a position in which it would tend to disengage from the grill. For safety reasons this is obviously undesirable and this is why an acute angle is used, since it means that when the handle is above the hooks the bending moment is significantly reduced.

With the grill hanging down from the lifter, it can be turned and positioned generally as shown in FIG. 6 and lowered into position. Now the food-supporting surface has been elevated in relation to its original position which was similar to that of the grill 46.

It will be appreciated that the lifter is both simple and effective in use. Because of its shape, it can safely be used to lift quite heavy and hot grills without fear of dropping the grill or burning the users hand. The grill can be relocated quite readily either by simply turning it back to front, by turning it over or by a combination of both of these movements. This represents a significant advance in the art because prior structures suffered from disadvantages which could result in danger to the user and did not enable grills to be both turned over and also turned around.

The preferred embodiment is made up from two parts as illustrated in FIG. 7. A strip of steel stock is notched to define cut-outs 60, 62 symmetrically positioned about a central opening 64 provided for hanging this part in a painting booth. Prior to or after bending the metal at the cut-outs as shown in FIG. 7, the reaction portions 28, 30 and end portions 32, 34 are formed into their final relationship with the related legs 24, 26. After this forming, the formerly straight strip is bent at the cut-outs 60, 62 into the position shown in FIG. 7 at which point the handle 22 is put into position. This handle is of wood and defines an elongated slot 66 proportioned to receive a portion 68 of the strip between the cut-outs 60, 62 as shown in FIG. 1. Ends of the handle 22 are also slotted at 70, 72 for engagement with portions of the legs 24, 26 adjacent the cut-outs 60, 62.

After positioning the handle on the central portion 68, the legs 24, 26 are deflected towards one another into their final position shown in FIG. 1. The arrangements at the ends of the handle are illustrated with reference to the leg 24 in FIG. 8. Here it will be seen that after the lifter is finally formed, the cut-out takes a shape defining a step 74 which traps the main body of the handle between this step and a corresponding step on the leg 26 in engagement with the central portion 68. Consequently, the handle is located positively without the need for fasteners which would be heat conducting from the portion 68 should the lifter be heated due to its use with a hot grill.

Figure 9:
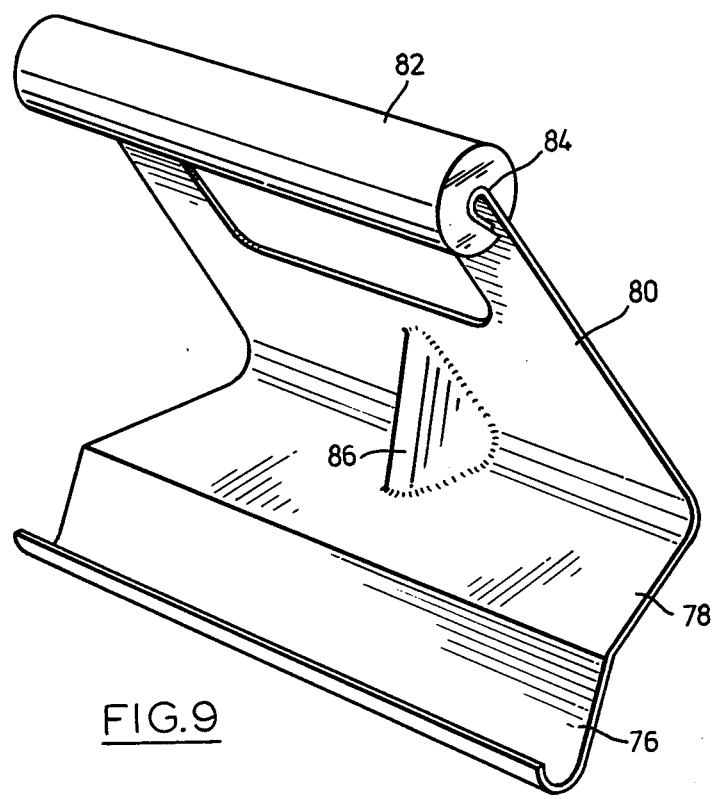
FIG. 9 is a perspective view of an alternative embodiment of the lifter.

It would be evident that variations can be made within the scope of the invention. For instance, the handle 22 could be of another material and of course it would be possible to form the lifter in a different fashion. An example of a variation is shown in FIG. 9 in which a piece of relatively thin sheet material is formed to define a single but elongated hooked end portion 76, a single reaction portion 78, a bifurcated leg 80, and a handle 82. The handle defines a slot for receiving rolled end portions 84 on the two parts of the bifurcated leg. The bend between the reaction portion 78 and the leg is reinforced by a deformation 86 in accordance with accepted sheet metal practice. Although this structure differs significantly from that of the preferred embodiment, it is within the inventive concept. A person gripping the handle 82 would do so at a location which is between the ends of the hooked portion and spaced from the hooked portion so that when a grill is lifted, it is stable between these ends and below the person's hand.

It will be evident that other variations can be made within the scope of the invention and such variations are within the scope of the claims.

I claim:

1. A lifter for use in lifting and manipulating a grill over a heat source such as a barbeque, the grill having spaced parallel bars and the lifter comprising:
   a hooked portion shaped to pass between adjacent bars of the grill and upon rotating the lifter, to locate under one of the adjacent bars with ends of the hooked portion spaced along this bar;
   a reaction portion spaced in a different plane from the hooked portion by the thickness of the grill bars for engagement with at least one further bar spaced from said adjacent bars, the reaction portion having a length at least twice the distance between adjacent grill bars;
   a handle, and ends of the hooked portion being spaced not less than the width of the handle;
   means coupling the handle, hooked portion and reaction portion in fixed relationship relative to one another, the hooked portion and handle lying generally in a plane perpendicularly to a second plane containing the reaction portion such that the lifter can be used to move the grill while maintaining the grill in a generally horizontal position with the reaction portion in engagement with said further bar or bars, and such that the lifter can be used to lift the grill by an outermost one of the grill bars with the grill hanging freely from the lifter.

2. A lifter for use in manipulating a grill used on a barbeque, the lifter comprising:
   a pair of aligned hooked portions adapted to pass between a pair of adjacent bars and to engage under one of the bars of the grill; a handle being located generally between and spaced from the aligned hooked portions;
   a pair of generally parallel legs extending from respective ends of the handle; and
   a pair of reaction portions extending between rspective legs and associated ones of the hooked portions, each reaction portion being spaced in a different plane from the hooked portion by the thickness of the grill bars for engagement with at least one further bar spaced from said adjacent bars, the reaction portions having a length at least twice the distance between adjacent grill bars,
   the handle, the hooked portions and the reaction portions being arranged in a fixed relationship relative to one another, the hooked portions and the handle lying generally in a plane perpendicular to a second plane containing the reaction portion such that the lifter can be used to move the grill while maintaining the grill in a generally horizontal position with the reaction portions in engagement with said further bar or bars, and such that the lifter can be used to lift the grill by an outermost one of the grill bars with the grill hanging freely from the lifter.

3. A lifter as claimed in claim 2 and further comprising a central portion extending between the legs and in which the handle is of a heat insulating material, the handle covering at least a major part of the surface of the central portion.

4. A lifter as claimed in claim 3 in which the legs define a pair of mutually facing steps; said steps retaining the handle in secure engagement with the central portion.

* * * * *